United States Patent [19]

Meckler

[11] 4,382,434
[45] May 10, 1983

[54] PRISMATIC TRACKING INSOLATION COLLECTOR

[76] Inventor: Milton Meckler, 16348 Tupper St., Sepulveda, Calif. 91348

[21] Appl. No.: 271,838

[22] Filed: Jun. 9, 1981

Related U.S. Application Data

[63] Continuation-in-part of Ser. No. 30,328, Apr. 16, 1979, abandoned.

[51] Int. Cl.³ .................................................. F24J 3/02
[52] U.S. Cl. ................................. 126/425; 126/438; 126/440; 350/289; 353/3
[58] Field of Search ............... 126/417, 424, 425, 438, 126/439, 440, 441, 442, 450, 451; 353/3; 250/203 R, 491; 350/288, 289, 292, 6.1, 6.91, 424, 286

[56] References Cited

U.S. PATENT DOCUMENTS

| | | | |
|---|---|---|---|
| 1,081,098 | 12/1913 | Delagarza | 126/440 |
| 1,683,266 | 9/1928 | Shipman | 126/438 |
| 2,803,591 | 8/1957 | Coanda | 126/438 |
| 3,884,217 | 5/1975 | Wartes | 126/438 |
| 4,068,474 | 1/1978 | Dimitroff | 126/439 |
| 4,139,286 | 2/1979 | Hein et al. | 353/3 |
| 4,148,300 | 4/1979 | Kaufman | 126/438 |
| 4,168,696 | 9/1979 | Kelly | 126/440 |
| 4,204,881 | 5/1980 | McGrew | 126/438 |
| 4,205,661 | 6/1980 | Chapman | 126/425 |
| 4,249,516 | 2/1981 | Stark | 126/439 |
| 4,257,401 | 3/1981 | Daniels | 126/440 |
| 4,321,909 | 3/1982 | Trihgy | 126/425 |
| 4,337,759 | 7/1982 | Popovich et al. | 126/438 |

*Primary Examiner*—Daniel J. O'Connor
*Attorney, Agent, or Firm*—William H. Maxwell

[57] ABSTRACT

A tracking insolation collector characterized by elongated prisms of acute apex angle maintained with an objective face disposed normal to the sun rays and through which dispersed light is projected from a transmission face and onto a coordinated mirror for geometric focus onto a target, the heat rays of the spectrum being concentrated onto the target by lens means on the plane of said projection, an astro timer revolving the prisms and mirrors throughout reversed morning and afternoon tracking modes in alignment with the traverse plane of the sun.

13 Claims, 9 Drawing Figures

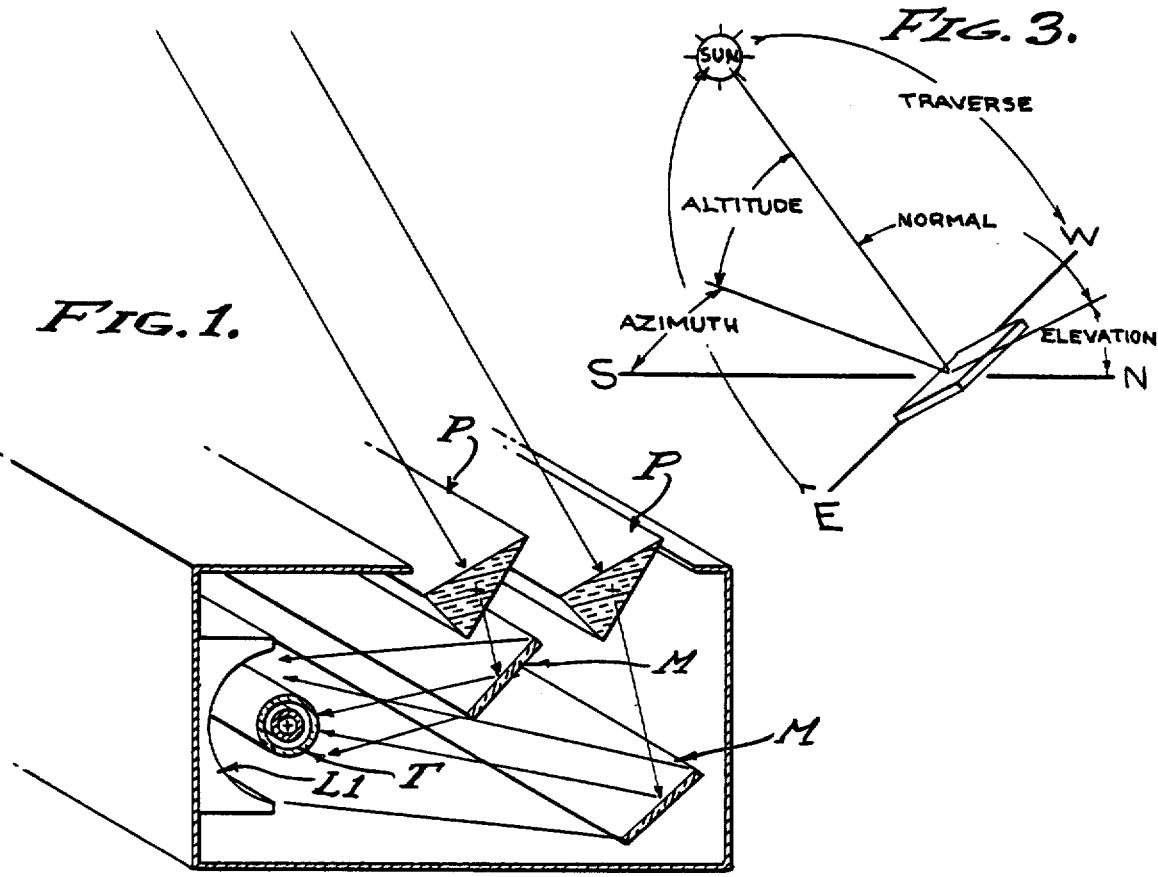
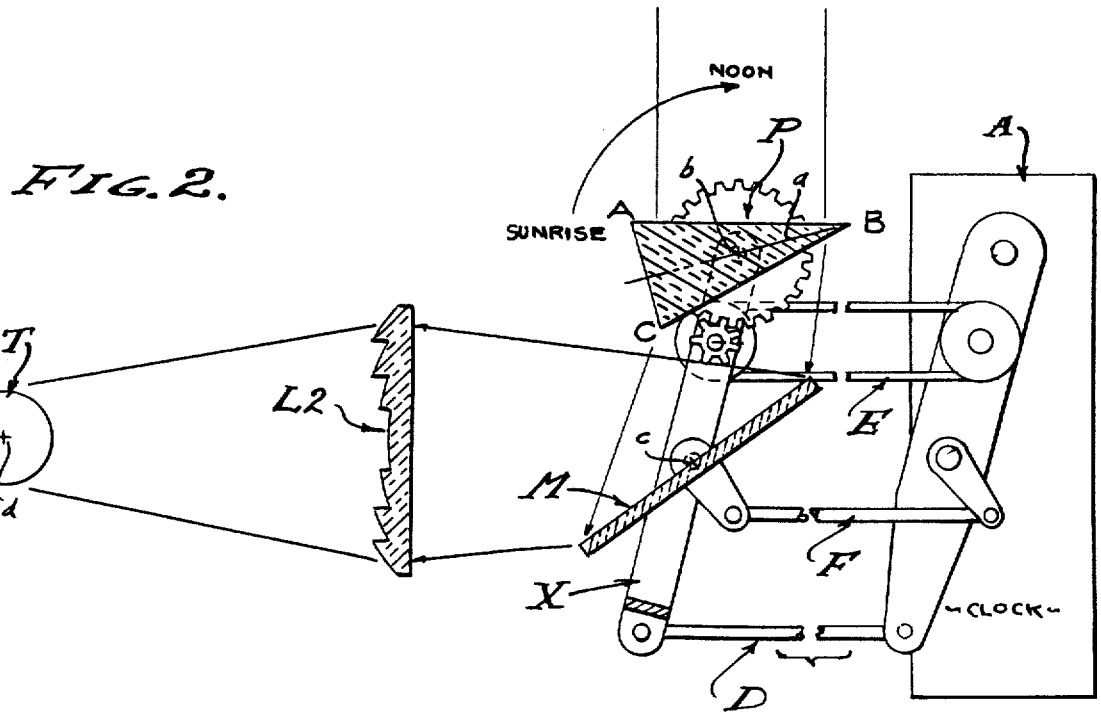

PRISMATIC TRACKING INSOLATION COLLECTOR

This is a continuation in part application of application Ser. No. 30,328, filed Apr. 16, 1979, now abandoned, and is copending with application Ser. No. 271,837 filed on even date herewith.

BACKGROUND

The collection of solar energy for heating and the generation of power involves the radiation of sunlight onto conduits and power generating cells; conduits transporting a heat transfer media and/or energy converters that directly produce electrical power. Solar quantity or concentration becomes a primary consideration for the impingement of light rays onto said collector tubes or converters, and heretofore the white light of the sun rays has been concentrated for so-called high temperature heat collection or conversion. However, it is known that the longer "red" (infrared) rays of light are those which have the greater heating effect, while the shorter "violet" or "ultraviolet" rays have the lesser heating effect and are required, for example in photovotaic power generation. Furthermore, when considering photovoltaic power generation, only high energy photons (some 45% of the solar radiation) will be effective, ie the ultraviolet and some of the visible spectrum, but not the infrared. Also, those invisible infrared rays just beyond the "red" of the visible spectrum have known penetrating heating effect. Therefore, it is a general object of this invention to advantageously employ either or both of those rays, namely infrared and ultraviolet at opposite ends of the spectrum, and of the sun which are known to have said effects, in preference to those rays that do not; and to this end dispersion is employed to break sunlight into its parts which are then selectively focused upon a target collector or converter as circumstances require.

The prism is a solid transparent body that refracts light, and strictly speaking is a solid figure with ends of equal size and shape in parallel relation and whose sides extending therebetween are parallelograms. The most common prism is a triangular solid of glass or the like, for refracting and dispersing light into and beyond the visible spectrum ranging from infrared heat rays to the power generating ultraviolet rays. Dispersion in the prism is by means of refraction or the bending of light rays as they pass obliquely from one medium (air) to the other (glass or plastic) or different density in which its speed changes; a phenomenon thereby breaking the light into its constituent parts represented by the bands of the spectrum. It is an object therefore to advantageously employ said prismatic phenomenon and concentrate therefrom a range of heat rays which is most practical as may be required for application to the target collector or converter.

The selection of heat rays involves an alignment with that portion of the spectrum both visible and invisible, and the projection of that portion upon the collector or converter. The projection of selected heat rays can be direct or concentrated and at a 1 to 1 ratio or at a concentration ratio for developing commensurately high temperature or energy at the target. That is, direct projection is suitable for low temperature-low power operations, while concentrated projection is necessary for high temperature-high power operations. It is an object therefore to concentrate that portion of the spectrum selected for heating and to project it exclusively. As stated above, the dispersion is by means of a prismatic solid which refracts bands of light along angularly divergent "focal lines or planes". Accordingly, a linear lens having a focal line or plane is aligned with the median focal plane of the selected spectrum portion emitting from the prism to project the same to the target collector or converter also of linear form at the point of focus. In practice, a linear Fresnel lens is used for this projection.

Tracking of the sum in its traverse between horizons is either by bodily movement of the apparatus herein disclosed or preferably by turning of the prism disclosed in a plane substantially normal to the sun in its movement across the sky. In practice, a clock drive more specifically referred to as an "astro timer" is employed to revolve the prism in order to maintain substantial alignment of the aforesaid "focal plane" of the prism and lens projection respectively. Nominal operational time periods are accommodated by revolvement of the prism alone, while extended operational time periods are accommodated by combining therewith a reflective mirror that also moves with the astro timer or clock drive to track the selected spectrum onto the target. A feature is the use of an array of prismatic projection units and each with its prism and mirror articulated to concentrate the selected spectrum onto the target collector or converter for high heat and/or power operation. In practice therefore, each mirror has its angular adjustment to the target, and the distance to the target from each prism unit is accommodated by the focal length of its projection lens or a collection lens.

The optics of the collector prism is critical, with the apex B uppermost and the quadralateral faces AB and CB active to refractively pass sunlight so as to disperse the same into the utilitarian spectrum, especially the heat portion thereof. In accordance with this invention the lowermost quadralateral face AC is inactive and in practice is frosted so as to be non-reflective. Accordingly, a feature is the reduction of internal reflection within said prism by maintaining substantial normality of the face AB to the solar source rays and by careful selection of the acute angle at the apex B. Therefore, the critical angle of the prism is at the apex B, and the optimum of which has been found to be approximately 36° based on an air to glass interface and which varies as a function of the respective indicies of refraction, for the substantial elimination of internal reflection and for the purpose of conducting the tracking function through a wide range, and especially in combination with a mirror M that contra rotates therewith at a ratio of 1 to 2. That is, the mirror rotation is 1° to 2° of prism rotation. The relatively small apex angle of the prism operates in conjunction with the tracking mirror without the former blocking light, especially in the heat spectrum portion, from the latter.

The heat collector and/or power converter can vary in form and in construction, however it is disposed linearly along the focus of the at least one prismatic-lens collector above referred to. A feature of this invention is the conservation of concentrated heat in the collector or converter at the point of focus, and which is structurally compact while the collecting prism and tracking mirror are structurally expansive. In practice, the said collector or converter is encased within a transparent tube, preferably vacuumized, for the substantially complete absorption of energy from the heat rays impinging thereupon. A condensing reflector backs up the target to return the heat rays that are or may be dispersed to initially pass thereby.

DRAWINGS

The various objects and features of this invention will be fully understood from the following detailed description of the typical preferred forms and applications thereof, throughout which description reference is made to the accompanying drawings, in which:

FIG. 1 is a perspective view of the tracking insolation collector of the present invention, in its preferred form involving an array of prisms and coordinated mirrors.

FIG. 2 is a detailed view showing a modified form of prismatic tracking collector involving a focusing lens.

FIG. 3 is a diagramatic perspective view illustrating the altitude and traverse relationship of the sun to the collector.

Figure 9:
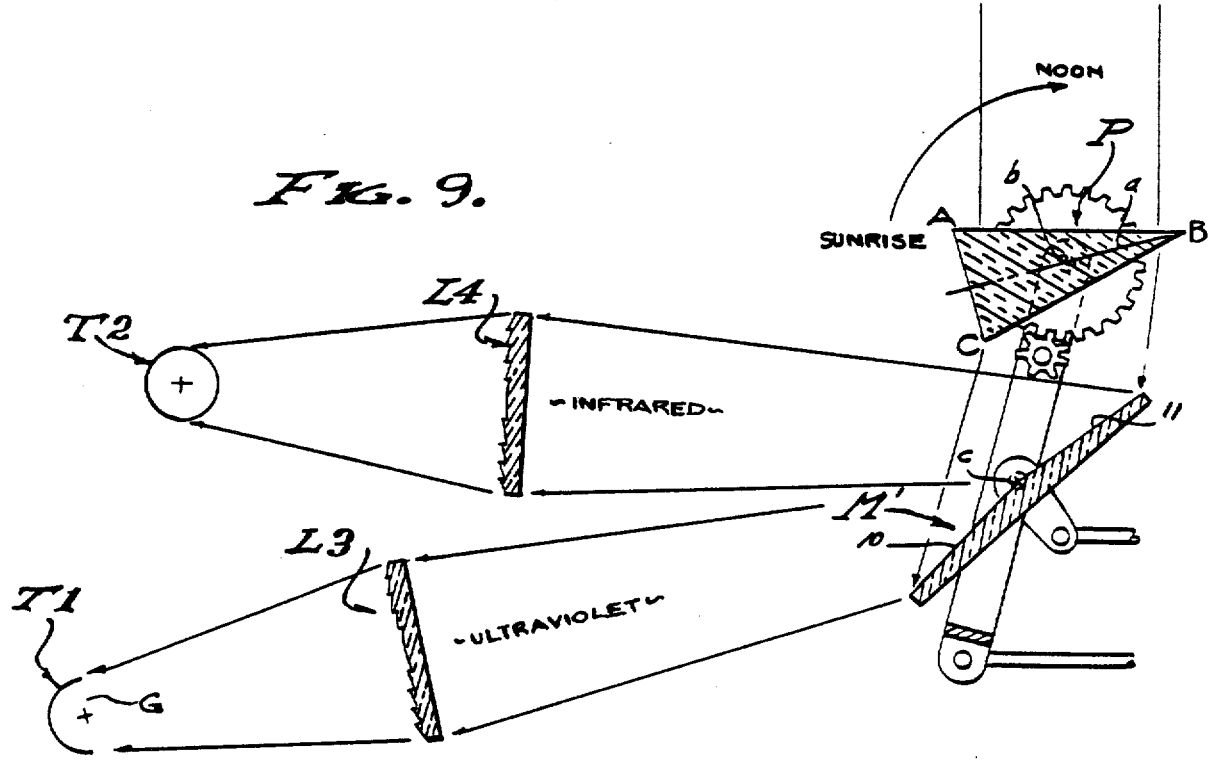

And FIG. 9 is a view similar to FIG. 2 showing the split rays and each involving a focusing lens.

PREFERRED EMBODIMENT

Referring now to the drawings, this invention involves primarily the use of a prism P aligned with its objective face AB-CB substantially normal to the solar source rays, and disposed to focus heat rays onto a target heat collector or energy converter. It is to be understood that the prism and collector-converter arrangement can be moved bodily, but that it is preferable to track the sun by revolvement of the prism and by maintaining its objective face substantially normal to the sun rays. Accordingly, the collector assembly is immovably disposed substantially normal to the altitude of the sun and with the target T fixed, while the prism P revolves in timed relation to the traverse of the sun under control of an astro timer A operating a means D which maintains the focal line at the target. In practice, concentration of the heat or energy portion of the spectrum is desired and accordingly a lens is provided to focus the heat or energy rays onto the target T. And in order to track the sun throughout a substantial portion of its traverse across the skies, a mirror M compliments the prism and is coupled to rotate therewith and thereby maintain the line of focus upon the target.

The prism P is an elongate solid of triangular cross section having parallel corners A, B and C defining reversely positionable faces AB and CB. The apex angle B is critical and its optimum determined to be approximately 36° for glass air interface, while the face AC is inactive and frosted so as to be non-reflective. It is the purpose of this prism to pass a maximum amount of light and to reduce an/or practically eliminate internal reflection, and to these ends the objective face AB or CB is disposed substantially normal to the solar source rays and the critical angle B minimized to 36°. The transparent highly polished faces AB and CB are surface coated for maximum light transmission and minimum internal reflection.

Structurally, the prism P is made of glass or a plastic material such as "Acuvue 360" as manufactured by Swedlow, Inc. of Garden Grove, California, a high quality cast optical acrylic having a reflection index of 1.49 (glass 1.5) and a light transmission factor of 92%; said surface coating increasing the said light transmission efficiency. A feature therefore is the light weight of the plastic, acrylic, prism having a slender cross section and with a specific gravity of 1.19; considerably lighter in weight than any glass and much less fragile.

The prism P receives parallel solar source rays which enter the normal objective face AB or CB angularly with respect to a bisecting median plane a within the prism and with no dispersion and minimized refraction. The parallel rays then exit through the angularly related 36° transmission face BC or AB with one stage of substantial refraction and minimized internal reflection. The prismatic refraction inherently produces spectral dispersion, with the red and infrared light concentrated toward the edge B as the light emits from said prism P.

The light from prism P emanates divergently from transmission face CB or AB and plays on the target T, and in accordance with the invention the heat and/or energy rays concentrated by prismatic dispersion are played upon the target. For example, those rays of the spectrum in the range of yellow, orange, red and infrared are played upon the target T for heating and/or energy change as the case by be. Accordingly, a dispersed heat range of light rays from face CB (or AB) is played onto the target T, including the infrared rays beyond visible range.

A feature is the geometric focus of heat range rays upon the target T by use of coordinate revolvement of the prism P and the mirror M (see FIGS. 4 through 7). In practice, a first surface reflector mirror is employed, cast of the same acrylic plastic as the aforementioned prism and surface coated and aluminized for efficient relfection. Accordingly, there is a switching means of the astro timer A operating as a clock drive to actuate a lever means E that revolves the prism P on an axis b substantially normal to the altitude of the sun as it traverses (see FIG. 3) and so that its objective face AB or CB remains substantially normal to the sun rays emitted in parallel relation. As shown throughout the drawings, the target T is fixedly positioned as is the axis b of the prism P, and the mirror M is positioned by the astro timer A operating as a clock drive to actuate a lever means D about said axis b so that its alignment with prism P remains effective to focus said heat range rays upon the target T. As shown, a means F revolves the mirror M on an axis c parallel to axis b. The means E and F are carried by the lever of means D to move therewith, as shown. It will be seen that the prism P—mirror M combination has its projection plane b–c and that the mirror M—target T combination has its projection plane c–d. The astro timer A operates as a clock drive also to operate the belt or chain of the means F, as shown. Since the target T is fixedly positioned, the axis b is the center of rotation of the prism P—mirror M combination when adjusting the mirror M angularly with respect to the prism P and target T so as to bisect the included angle disposed between the said projection planes b–c and c–d. Accordingly, the aforesaid parallel sun rays are directed toward the target T and divergently dispersed along plane c–d.

Figure 8:
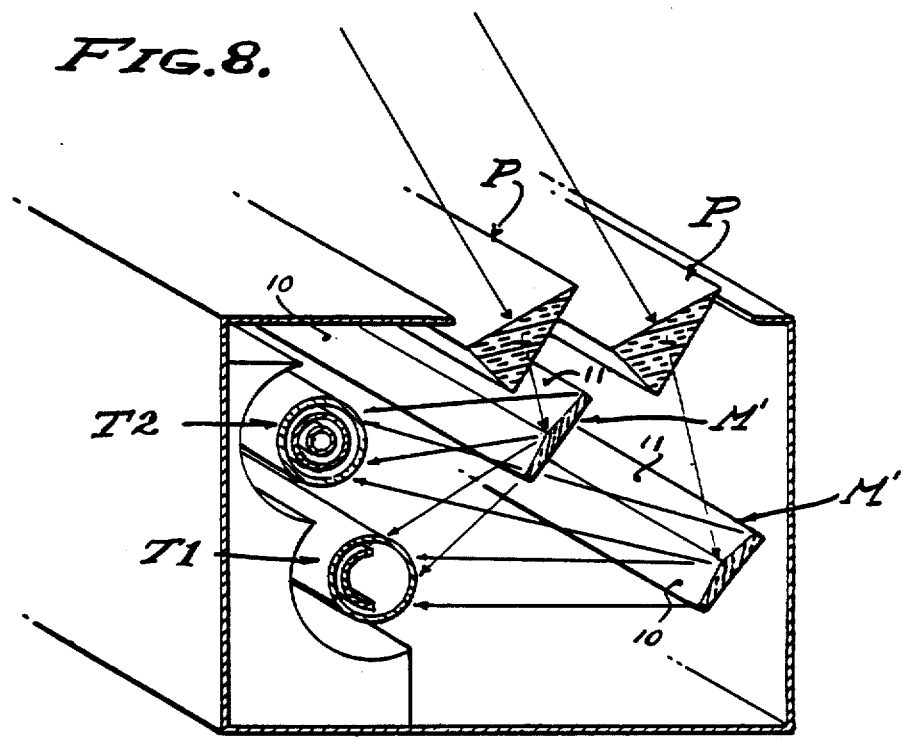
FIG. 8 is a perspective view similar to FIG. 1 and shows a second modified form of the present invention, wherein the infrared and ultraviolet light is split.

The target T is a heat converter or energy generator as may be required. Flat plate targets may be employed, although more sophisticated vacuumized co-cylindrical collectors or converters are preferred. As shown for example, co-cylindrical tubing is disposed concentric with an axis d along which it conducts a heat transfer media, the inlet of which is in the outer annulus and the heat absorption and outlet of which is from a central tube on the line d. The target can be an energy converter such as a voltaic power generating means as shown in FIGS. 8 and 9 enclosed in a transparent tube that is vacuumized so that the insolation responsive elements thereof are centered on the focus line d, in which case ultraviolet light, shorter wave lengths of the spectrum, are concentrated upon the target.

Concentration of heat range rays is provided for in the lens which receives the dispersed rays from the prism P or from the mirror M. As described, the heat range rays are projected divergently from the prism P or mirror M, coextensively of the elongated prism and complementary mirror. Accordingly, the lens is coextensive with the prism and/or mirror and is positioned on plane b–c or c–d to embrace and collect the heat ray spectrum, for example the yellow to infrared rays. As shown in FIG. 1, the lens L1 is a first surface reflector in the form of an elongated cylindrically concaved mirror, cast of the same acrylic plastic as the aforementioned prism P and mirror M, and surface coated and aluminized for efficient reflection. Lens L1 is of linear form that concentrates the divergent spectrum by focusing it onto the target line at d. Lens L1 is therefore centered behind the target and aligned with the plane c–d to collect and concentrate insolation onto the target T. As shown in FIG. 2, the lens is a Fresnel lens L2 of linear form focusing the divergent spectrum onto the target line at d. The lens L2 is therefore centered on the plane c–d between the turning axis c of mirror M and the heat concentration line d at the target T. Like the prism, the lens L2 is cast of the same acrylic plastic as prism P, of light weight and optically efficient. In practice, either or both lenses L1 and/or L2 can be simultaneously used.

The above described combinations of elements are intended for singular use or multiple use in an array as shown in FIG. 1. It is to be understood that solar position as related to latitude will determine effective angles of elevation as shown in FIG. 3, and that the seasons will cause variations in that angle as well as the effective time of day for solar energy collection. Also for example, it may be that effective insolation can be realized from one hour after sunrise to one hour before sunset, or between shorter or longer hours as determined by location at different latitudes. As shown in FIG. 1, the sun rays are received by an array of prisms P between which there is no shadow cast by any one prism upon the other. Likewise, the mirror M reflecting the heat range portion of the spectrum projects rays one beneath the next without obstruction. Concentration is then by means of the lens means that focuses on line d along the target T. It will be observed that the objective face of each prism is substantially normal to the parallel incoming light rays, and that the dispersion through the prism P causes divergence of the separated rays. These separating rays along planes b–c are reflected by the mirrors M to project along planes c–d, where they are collected and focused by lenses L1–L2 upon the target line d. The array is disposed on inclined elevations as shown and the mirrors are tipped thereby so as to be substantially normal to the altitude of the sun. The prisms P and mirrors M are driven to move together by coordinate means D,E and F motivated by the astro timer A clock means, thereby to track the sun and project the reflected rays thereof onto said target line d.

Figure 4:
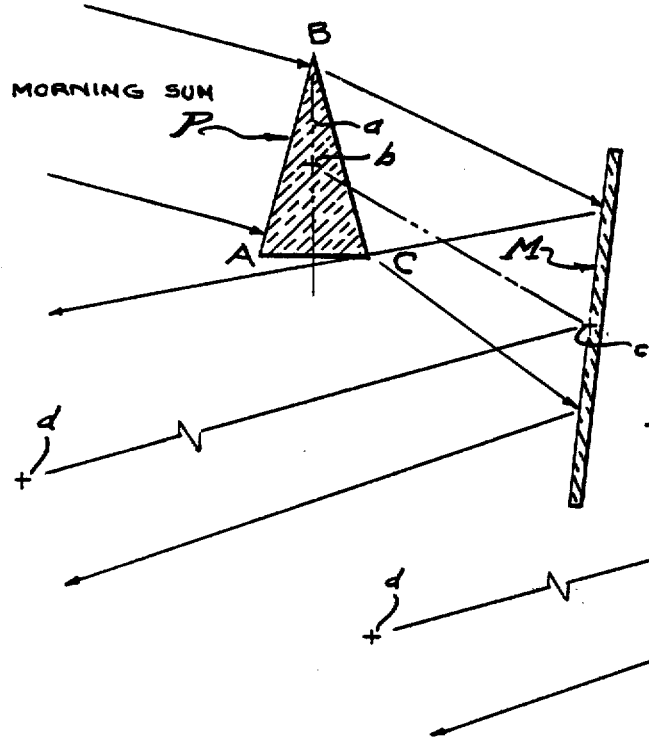
FIGS. 4 through 7 are views similar to FIG. 2 showing the transition between morning and afternoon operation, and the reversal of the prism which characterizes the morning and afternoon modes of operation.
Figure 5:
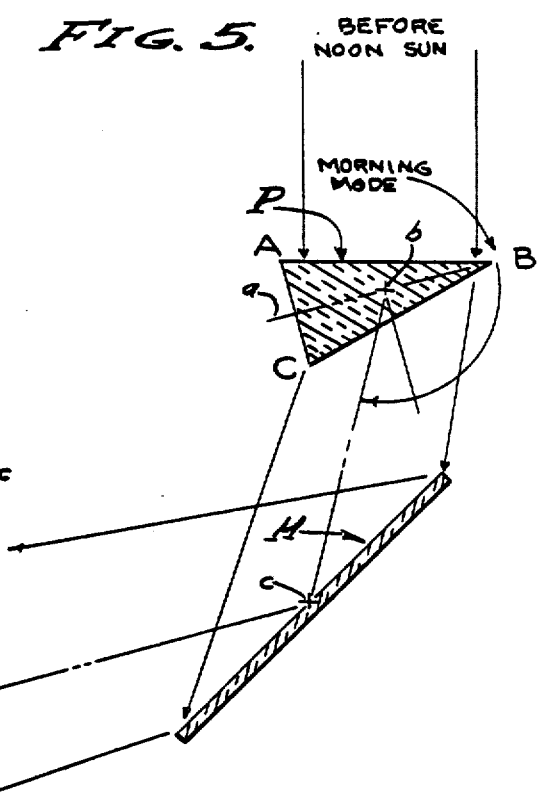
Figure 6:
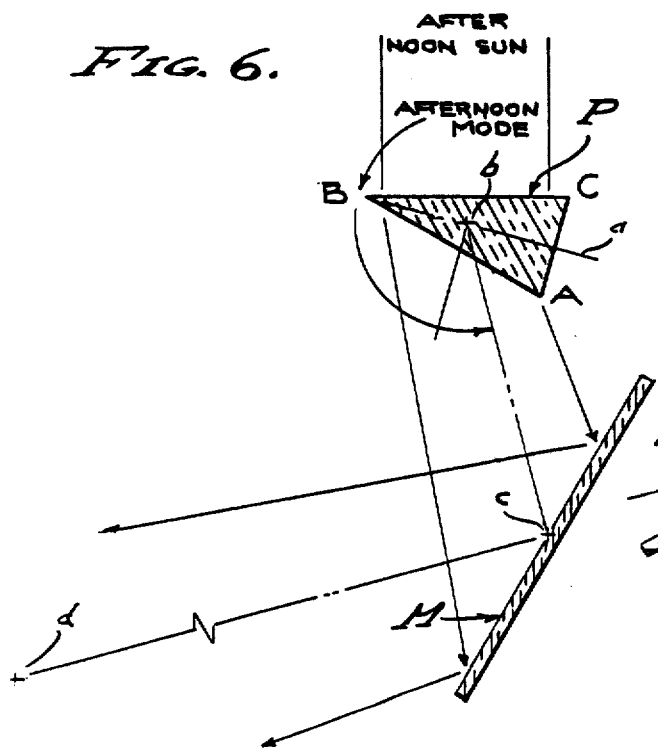
Figure 7:
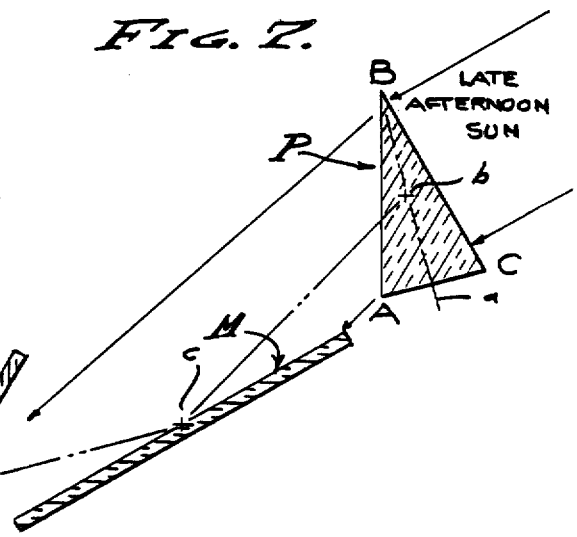

Referring now to FIGS. 4 through 7 and to the controlled articulation by the astro timer A and related means D,E and F actuated thereby, it is the rotative positions of the prism P and mirror M that are coordinated; maintaining the objective face of the prism normal to the sun rays; and maintaining the reflection of dispersion light along the plane c–d. A feature is the two modes of operation for alternately switching of said acute apex angle away from the zenith position of the sun; a morning mode as shown in FIGS. 4 and 5, and an afternoon mode as shown in FIGS. 6 and 7. It is to be observed that the transmission from morning to afternoon modes is characterized by a reversal in positioning of the prism P and mirror M, always directing light laterally to the fixedly positioned target T at line d. Accordingly, three distinct movements are involved, firstly the revolvement of prism P by means E, secondly the shifting or reversal in position of the rotational axis c of prism P and mirror M by means D, and thirdly the revolvement of said mirror M by means F.

The bent angle of the dispersed rays emanating from the transmitting face of the prism remains the same throughout each mode; compare FIGS. 4 with 5 and 6 with 7. And to these ends, the transition from morning to afternoon mode involves means D angularly displacing the axis c from the median plane a through prism P, in each prism mode, so that the bent angle of light is always directed from axis b to axis c. In practice, a cradle X is shiftable to have two angularly displaced positions with respect to the plane a, one as shown in FIGS. 4 and 5 and at all rotative prism positions therebetween, and the other as shown in FIGS. 6 and 7 and at all rotative positions therebetween. The means F revolves the mirror M in response to positions of the lever means E, so that the reflected angle of light from the mirror is always directed from c to d. In practice, the means F is a lever means (as shown) that ensures that a line drawn normally from the mirror at axis c always bisects plane b–c and plane c–d. Examination of FIGS. 4 through 7 will bear this out, and all of which occurs as the astro timer means A revolves the prism P, there being two mode relationships of prism P and the cradle means X, the one where the prism face AB is the objective face, and the other one where the prism face CB is the objective face. There is a switching or reversal in position of the prism P, whereby the one prism serves two purposes, or two roles. In both modes the incoming light is normal to the objective face of the prism, and the transmission light is at a bent angle toward the base AC of the prism. It will be seen from FIG. 1 that adjustments are made to the reflective angles of mirros M so as to accomodate the stepped relationship of the array as shown.

Referring now to FIGS. 8 and 9 of the drawings and to the split ray version of the present invention, this embodiment employs the features hereinabove described with respect to both embodiments of FIGS. 1 and 2, as shown in FIGS. 8 and 9. A feature of the FIGS. 8–9 embodiment is the split mirror M' configuration and the employment of dual targets T1 and T2, and particularly the target T1 in the form of a voltaic power generator G that responds to ultraviolet light. The target T2 is in the form of the previously described media conducting heat collector. Accordingly, the ultraviolet and infrared portions of the spectrum are reflected divergently by angularly reflective faces 10 and 11 of mirror M', the ultraviolet and infrared light being transmitted thereby on separate (second) median planes to the separate targets T1 and T2. It will be observed that the acute apex angle portion of the prism transmits the longer infrared light portion, while the base portion of the prism transmits the shorter ultraviolet portion of the sun light, and that the obtusely related reflection faces 10 and 11 separate said two portions of the spectrum so that they are reflected divergently to the separate targets T1 and T2. I will be observed by comparing FIGS. 4 and 6 that switching the acute apex angle of the prism causes a reversal of the spectrum cast upon the mirror M or M', between the before and the afternoon modes. Therefore, the targets T1 and T2 are also switched (not shown) for example as shown in the morning mode of FIG. 9 where the target T1 is associated with mirror face 10 and the acute apex angle and the target T2 with face 11, it being understood that in the afternoon mode of FIG. 6 the target T1 is associated with the mirror face 11 and the target T2 with face 10. In the FIG. 8 embodiment the separated spectrum directly plays upon the targets T1 and T2 on a one to one basis. In FIG. 9 the separated spectrum is focused by lenses L3 and L4 and upon the targets T1 and T2 on a concentration basis. The mirror M', lenses L3 and L4, and the targets T1 and T2 are all elongated members ad hereinabove described.

Having described only typical preferred forms and applications of my invention, I do not wish to be limited or restricted to the specific details herein set forth, but which to reserve to myself any modifications or variations that may appear to those skilled in the art as set forth in the limits of the following claims.

I claim:

1. A tracking insolation collector for operation in a plane substantially normal to the altitude traverse of the sun, and including;
    an elongated prism of acute apex angle rotatably mounted on a rotational axis disposed in said plane for tracking the altitude of the sun and for maintaining said acute apex angle away from the zenith position of the sun,
    the prism being reversible and having divergent faces used alternately for the reception and transmission of sun rays and dispersion thereof along a mean plane respectively,
    an elongated mirror coextensive with and rotatably mounted on an axis disposed along said mean plane and reflecting the incoming sun rays to a target line,
    a clock drive means comprising operating means to maintain the said reception face of the prism substantially normal to the incoming sun rays, operating means to maintain the said acute apex angle of the prism away from the zenith position of the sun, and operating means to rotatably position the mirror to reflect onto said target line,
    and an elongated insolation responsive target coextensive with said prism and on said target line and spaced from and parallel to the axes of prism and mirror rotation.

2. The tracking insolation collector as set forth in claim 1, wherein the acute apex angle of the prism is substantially 36° separating the reception and transmission faces.

3. The tracking insolation collector as set forth in claim 1, wherein rays toward the infrared dispersion from the transmission face of the prism are projected by the mirror and concentrated on said target.

4. The tracking insolation collector as set forth in claim 1, wherein the clock drive means and its operating means switches the acute apex angle of the prism so that it is disposed away from the morning sun, and so that the bent angle of refraction is downward from the prism.

5. The tracking insolation collector as set forth in claim 1, wherein the clock drive means and its operating means switches the acute apex angle of the prism so that it is disposed away from the afternoon sun, and so that the bent angle of refraction is downward from the prism.

6. The tracking insolation collector as set forth in claim 1, wherein the clock drive means and its operating means alternately switches the acute apex angle of the prism so that it is disposed away from both the morning and afternoon sun, and so that the bent angle of refraction is always downward from the prism.

7. The tracking insolation collector as set forth in claim 1, wherein the mean plane of dispersion from the transmission face of the prism extends between the rotational axes of the prism and mirror respectively, the mirror being carried by a cradle means and moved with rotation of the prism by the clock drive means and its operating means.

8. The tracking insolation collector as set forth in claim 1, wherein a cradle means shifted by the clock drive means and its operating means carries the pivotal axis of the mirror on the mean plane of dispersion extending from the transmission face of the prism and with its acute apex angle away from the zenith position of the sun.

9. The tracking insolation collector as set forth in claim 1, wherein the acute apex angle of the prism is substantially 36°, and wherein the clock drive means and its operating means maintains the acute apex angle of the prism so that it is disposed away from the morning sun, and so that the bent angle of refraction is always downward from the prism.

10. The tracking insolation collector as set forth in claim 1, wherein the acute apex angle of the prism is substantially 36°, and wherein the clock drive means and its operating means maintains the acute apex angle of the prism so that it is disposed away from the afternoon sun, and so that the bent angle of refraction is always downward from the prism.

11. The tracking insolation collector as set forth in claim 1, wherein the acute apex angle of the prism is substantially 36°, and wherein the clock drive means and its operating means maintains the acute apex angle of the prism so that it is disposed away from both the morning and afternoon sun, and so that the bent angle of refraction is always downward from the prism.

12. The tracking insolation collector as set forth in claim 1, wherein the acute apex angle of the prism is substantially 36°, wherein the clock drive means and its operating means maintains the acute apex angle of the prism so that it is disposed away from both the morning and afternoon sun, and so that the bent angle of refraction is always downward from the prism, and wherein a cradle means shifted by the clock drive means and its operating means carries the pivotal axis of the mirror on the mean plane of dispersion extending from the transmission face of the prism and with its acute apex angle away from the zenith position of the sun.

13. The tracking insolation collector as set forth in any one of claims 1 through 12, wherein the elongated prism concentrates infrared light through its acute angle portion and ultraviolet light through its base portion, and wherein the elongated mirror is split to have two angularly related faces, one face receiving the concentration of infrared light from the acute angle portion of the prism and reflecting that incoming portion of the spectrum to a heat absorbing target, and the other face receiving ultraviolet light from the base portion of the prism and reflecting that portion of the spectrum to a power generating target.

* * * * *